United States Patent [19]

Krishnan et al.

[11] Patent Number: 5,502,138

[45] Date of Patent: Mar. 26, 1996

[54] TEXTILE COATING AND METHOD OF USING THE SAME

[75] Inventors: Venkataram Krishnan, Cary; Winfeld S. Rutherford, Durham, both of N.C.

[73] Assignee: Reichhold Chemicals, Inc., Durham, N.C.

[21] Appl. No.: 454,576

[22] Filed: May 30, 1995

Related U.S. Application Data

[60] Division of Ser. No. 410,047, Mar. 24, 1995, which is a continuation-in-part of Ser. No. 113,030, Aug. 27, 1993, Pat. No. 5,403,640.

[51] Int. Cl.$^6$ ........................................ C08F 24/00
[52] U.S. Cl. ................ 526/273; 526/318; 526/307.6; 526/292.3; 526/312; 526/318.2; 526/304
[58] Field of Search ................... 524/560, 550, 524/555, 556, 565, 571, 575, 589, 560; 526/273, 292.3, 304, 312, 318, 318.2, 307.6

[56] References Cited

U.S. PATENT DOCUMENTS

| | | | |
|---|---|---|---|
| 3,223,663 | 12/1965 | Altobelli et al. | 260/28.5 |
| 3,505,156 | 4/1970 | Handscomb et al. | 161/67 |
| 3,650,664 | 3/1972 | De Graff et al. | 8/18 |
| 3,860,441 | 1/1975 | Vaughn et al. | 117/65.2 |
| 3,878,151 | 4/1975 | Dachs et al. | 260/29.6 T |
| 4,072,794 | 2/1978 | Tomita et al. | 428/378 |
| 4,237,249 | 12/1980 | Balzer et al. | 525/369 |
| 4,251,581 | 2/1981 | Schoppa et al. | 428/95 |
| 4,309,179 | 1/1982 | Heuser et al. | 8/558 |
| 4,331,572 | 5/1982 | Tomasi et al. | 524/238 |
| 4,503,191 | 3/1985 | Stakelbeck | 524/159 |
| 4,808,459 | 2/1989 | Smith et al. | 428/95 |
| 4,836,828 | 6/1989 | Hussamy | 8/594 |
| 4,876,293 | 10/1989 | Durney et al. | 523/122 |
| 5,026,765 | 6/1991 | Katz et al. | 524/561 |
| 5,093,449 | 3/1992 | Durney Cronin et al. | 526/318 |
| 5,102,424 | 4/1992 | Karsunky et al. | 8/490 |
| 5,378,755 | 1/1995 | Krishnan et al. | 524/555 |

FOREIGN PATENT DOCUMENTS

| | | |
|---|---|---|
| 496925 | 8/1992 | European Pat. Off. . |
| 60-235874 | 11/1985 | Japan . |
| 3229703 | 10/1991 | Japan . |
| 1781237 | 12/1992 | U.S.S.R. . |
| 1169879 | 11/1969 | United Kingdom . |

*Primary Examiner*—Shrive Beck
*Assistant Examiner*—Erma Cameron
*Attorney, Agent, or Firm*—Bell, Seltzer, Park & Gibson

[57] ABSTRACT

The present invention provides an article of manufacture comprising a textile substrate and a coating being a polymer comprising a non-aromatic unsaturated mono- or dicarboxylic ester monomer and an aliphatic conjugated diene monomer. An unsaturated mono- or dicarboxylic acid monomer or a monomer based on the half esters of the dicarboxylic acid monomer can also be included. In one embodiment, the present invention provides a method of preparing a textile substrate comprising applying to a surface of the textile substrate a coating, the coating being a polymer comprising a non-aromatic unsaturated mono- or dicarboxylic ester monomer and an aliphatic conjugated diene and heating the surface of the textile substrate to dry the coating.

9 Claims, No Drawings

TEXTILE COATING AND METHOD OF USING THE SAME

RELATED APPLICATIONS

This application is a divisional of application Ser. No. 08/410,047, filed Mar. 24, 1995, which is a continuation-in-part of application Ser. No. 08/113,030, filed Aug. 27, 1993, now U.S. Pat. No. 5,403,640.

FIELD AND BACKGROUND OF THE INVENTION

This invention relates to a coating for textile substrates such as carpet and upholstery and its method of use.

Various tuft-lock coatings, carpet-backing adhesives and non-woven binder compositions for textile substrates are known. For example, U.S. Pat. Nos. 3,505,156 to Handscomb et al; 3,695,987 to Wistozsky, 4,595,617 to Bodgany and 4,808,459 to Smith et al. propose the use of various latexes for use as tuft-lock coatings. Exemplary carpet-backing adhesives are proposed in, for example, U.S. Pat. Nos. Re. 31,826 to Machell, 3,390,035 to Sands, 4,876,293 to Durney et al., 5,093,449 to Durney-Cronin et al., and 4,368,282 to Bogdany. Exemplary non-woven binder compositions are disclosed, for example, in U.S. Pat. Nos. 4,251,581 to Schoppa et al., and 4,673,616 to Goodwin.

These compositions are often based on styrene-butadiene copolymers which have in recent years attracted a lot of adverse publicity in carpet backing applications due to the presence of a by-product produced during the manufacture of styrene-butadiene latices known as 4-phenyl cyclohexene ("4-PCH"). This chemical formed only when styrene and butadiene are reacted is alleged to be responsible for the odor associated with new carpet. There is also the negative public perception that "sick building syndrome" is primarily caused by the off gassing of this chemical from carpets. Environmental concerns are also forcing carpet manufacturers to look at ways to recycle or reprocess used carpet to minimize land filling. Carpets made with styrene-butadiene adhesives are less suitable towards reprocessing using conventional extrusion and compression molding techniques. Styrene-butadiene adhesives also tend to phase separate during the extrusion process and thus lead to products with inferior mechanical properties. In addition, styrene-butadiene adhesives also typically do not depolymerize under extrusion conditions and this potentially makes it less amenable to recycling. Given this public scenario, it is considered desirable to eliminate or reduce the use of styrene and related aromatic compounds in polymeric coatings used with textile substrates, and particularly butadiene-based formulations, while avoiding any significant reduction in physical and mechanical properties of the polymeric coating.

Therefore, it is an object of the present invention to provide a polymer coating which eliminates the use of styrene in a butadiene-based formulation without sacrificing desirable physical or mechanical properties.

SUMMARY OF THE INVENTION

The present invention provides an article of manufacture comprising a textile substrate and a styrene-free conjugated diene based coating. The coating is a polymer comprising a non-aromatic unsaturated mono- or dicarboxylic ester monomer (e.g., methyl methacrylate) and an aliphatic conjugated diene monomer (e.g., 1,3-butadiene). The polymer can also include an unsaturated mono- or dicarboxylic acid monomer (e.g., acrylic or fumaric acid) or monomers based on the half ester of the unsaturated dicarboxylic acid (e.g., monomethyl maleate).

In one embodiment, the present invention provides a method of preparing a textile substrate comprising applying a coating to a surface of the textile substrate, the coating being a polymer comprising a non-aromatic unsaturated mono- or dicarboxylic ester monomer and an aliphatic conjugated diene, and heating the surface of the textile substrate to dry the coating. In another embodiment, the present invention provides a pile carpet comprising a primary backing, pile yarns extending from the front of the primary backing to form pile tufts, and having portions extending through the primary backing to the rear thereof, and a tuft-lock coating carried by the rear of the primary backing and securing the pile yarns to the primary backing, the tuft-lock coating being a polymer comprising a non-aromatic unsaturated mono- or dicarboxylic ester monomer and an aliphatic conjugated diene monomer, and preferably an unsaturated mono- or dicarboxylic acid monomer or monomer based on the half ester of the unsaturated dicarboxylic acid monomer.

In yet another embodiment, the present invention provides a method of recycling carpet comprising providing a carpet having a primary backing, pile yarns extending from the front of the primary backing to form pile tufts, and having portions extending through the primary backing to the rear thereof; and a tuft-lock coating carried by the rear of the primary backing and securing the pile yarns to the primary backing, the tuft-lock coating being a polymer comprising from about 50 to 70 percent, by weight, of a non-aromatic mono- or dicarboxylic ester monomer, from about 30 to 50 percent, by weight, of an aliphatic conjugated diene monomer, and from about 0.1 to 20 percent, by weight, of an unsaturated mono- or dicarboxylic acid monomer or a monomer based on a half ester of an unsaturated dicarboxylic acid; reducing the size of the carpet such as by shredding into pieces; and extruding the reduced in size, i.e., chopped up, carpet to provide an extruded article of manufacture.

DETAILED DESCRIPTION OF THE INVENTION

As summarized above the present invention relates to an article of manufacture comprising a textile substrate and a coating carried by the substrate. The coating composition is a styrene-free butadiene-based polymer comprising two basic components, namely a non-aromatic unsaturated mono- or dicarboxylic ester monomer and an aliphatic conjugated diene. The applicants are unaware of any coating compositions which eliminates the need for styrene in a conjugated diene (e.g., butadiene) based system. It is noted that although U.S. Pat. No. 3,505,156 to Handscomb et al. proposes reducing the amount of styrene from a butadiene-based composition, the reference does not propose eliminating styrene completely from such a coating system.

The textile substrate is coated with the coating by impregnating, padding or otherwise applying the coating to a surface of the textile substrate followed by heating the substrate to dry the coating. In a preferred embodiment, an unsaturated mono- or dicarboxylic acid monomer or a monomer based on the half ester of the dicarboxylic acid is included.

For purposes of this invention, the term "textile substrate" relates to a fiber, web, yarn, thread, sliver, woven fabric, knitted fabric, non-woven fabric, upholstery fabric, tufted carpet, pile carpet, etc. formed from natural and/or synthetic fibers. A particularly suitable textile substrate is a tufted carpet. Tufted carpet typically comprises a primary backing and pile yarns extending from the backing. The pile yarns can be cut to form tufts or can be looped to form a loop pile. The pile yarns are bonded to the primary backing using a coating sometimes referred to as a "tuft-lock" coating. The tufted carpet can be a unitary carpet or can include a secondary backing bonded to the primary backing. The secondary backing can be formed from natural fibers (e.g. jute), or synthetic fibers (e.g., polypropylene), and can be woven or non-woven materials. The secondary backing can also be a foam composition comprised of urethane polymers. The secondary backing can be bonded to the primary backing using the thermoplastic adhesive properties of the coating composition.

Another suitable textile substrate is a needled non-woven fabric formed from various natural and synthetic fibers such as described in U.S. Pat. No. 4,673,616 to Goodwin, the disclosure of which is incorporated herein by reference. The polymeric coating can be used to stiffen or rigidify the needled non-woven fabric to permit the fabric to be formed into a three-dimensional shape (i.e., it is moldable).

Suitable non-aromatic unsaturated monocarboxylic ester monomers are acrylates and methacrylates. The acrylates add methacrylates may include functional groups such as amino groups, hydroxy groups, epoxy groups and the like. Exemplary acrylates and methacrylates include methyl acrylate, methyl methacrylate, ethyl acrylate, ethyl methacrylate butyl acrylate, butyl methacrylate, 2-ethylhexyl acrylate, glycidyl acrylate, glycidyl methacrylate, -hydroxyethyl acrylate, hydroxyethyl methacrylate, hydroxypropyl acrylate, hydroxypropyl methacrylate, hydroxybutyl acrylate, hydroxybutyl methacrylate, 3-chloro-2hydroxybutyl methacrylate and the like. Exemplary amino-functional acrylates include t-butylamino ethyl methacrylate and dimethylamino ethyl methacrylate. Suitable non-aromatic dicarboxylic ester monomers are alkyl and dialkyl fumarates, itaconates and maleates, having one to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like.

The mono and dicarboxylic acid esters monomers may be blended or copolymerized with each other. For example, when the desired polymer includes an ester of a dicarboxylic acid monomer, it is preferable to form the polymer by copolymerizing the dicarboxylic ester monomer with an ester of a monocarboxylic acid monomer. Graft polymerization can also be used.

The non-aromatic unsaturated mono- or dicarboxylic ester monomer is used in an amount, based on total weight of the starting monomers, from about 10 to 90 percent by weight, preferably from about 30 to 80 percent by weight, and most preferably from about 50 to 70 percent by weight. A particularly preferred nonaromatic unsaturated monocarboxylic ester monomer is methyl methacrylate.

Suitable aliphatic conjugated dienes are $C_4$ to $C_9$ dienes and include, for example, butadiene monomers such as 1,3-butadiene, 2-methyl-1,3-butadiene, 2 chloro-1,3-butadiene, and the like. Blends or copolymers of the diene monomers can also be used. The aliphatic conjugated diene is used in an amount, based on total weight of the starting monomers, from about 10 to 90 percent by weight, preferably from about 20 to 70 percent by weight, and most preferably from about 30 to 50 percent by weight. A particularly preferred aliphatic conjugated diene is 1,3-butadiene.

Suitable unsaturated mono- or dicarboxylic acid monomers are acrylic acid, methacrylic acid, iraconic acid, fumaric acid and maleic acid. Suitable monomers based on the half ester of the unsaturated dicarboxylic acid monomer include monoesters of maleic or fumaric acid having the formula ROOC—CH=CH—COOH wherein R is a $C_1$ to $C_{12}$ alkyl group, for example, monomethyl maleate, monobutyl maleate and monooctyl maleate. Half esters of iraconic acid having $C_1$ to $C_{12}$ alkyl groups such as monomethyl itaconate can also be used. Blends or copolymers of the unsaturated mono- or dicarboxylic acid monomers and of the half ester of the unsaturated dicarboxylic acid can also be used.

The unsaturated mono- or dicarboxylic acid or monomer based on the half ester of the unsaturated dicarboxylic acid is used in an amount, based on total weight of the starting monomers, from about 0.1 to 20 percent by weight, preferably from about 0.3 to 10 percent by weight, and most preferably from about 0.5 to 5 percent by weight. A particularly preferred unsaturated monocarboxylic acid monomer is monomethyl maleate.

The polymer can include crosslinking agents and additives to improve various physical and mechanical properties of the polymer, the selection of which will be readily apparent to one skilled in the art. Exemplary crosslinking agents include vinylic compounds (e.g., divinyl benzene); allyllic compounds (e.g., allyl methacrylate, diallyl maleate); multifunctional acrylates (e.g., di, tri and tetra (meth)acrylates); self crosslinking monomers such as N-methylol acrylamide, N-methylol methacrylamide and $C_1$–$C_4$ ethers of these monomers respectively (e.g., isobutoxy methacrylamide), acrylamido glycolic acid and its esters, and alkyl acrylamido glycolate alkyl ethers (e.g., methylacrylamido glycolate methyl ether). The crosslinking agents can be included in amounts of up to about 7 percent by weight, and preferably about 0.05 to 5 percent by weight. Additional monomers can be included to improve specific properties such as solvent resistance (e.g., nitrile-containing monomers such as acrylonitrile and methacrylonitrile) and adhesion and strength (e.g., use of acrylamide or methacrylamide).

The polymer can also include an antioxidant. These compounds retard oxidation by atmospheric oxygen at moderate temperature. Antioxidants tend to reduce yellowing and oxidative degradation due to thermal or prolonged aging. Antioxidants are typically based on aromatic amines (e.g., N-phenyl-N'-(1,3-dimethyl-butyl)-p-phenylene diamine) or hindred phenols (e.g. 4,4'-butylidene bis(6-tert butyl m-cresol). The antioxidant is preferably directly incorporated into the polymer during polymerization and is bound to the polymer chain. Phenolic antioxidants are preferred due to their reduced tendency towards discoloration.

Other additives include other natural and synthetic binders, fixing agents, surface-active compounds, wetting agents, plasticizers (e.g., diisodecyl phthalate), softeners, foam-inhibiting agents, froth aids, other crosslinking agents (e.g., melamine formaldehyde resin), flame retardants, catalysts (e.g., diammonium phosphate or ammonium sulfate), dispersing agents, etc., the selection of which will be readily apparent to one skilled in the art.

The textile substrate, such as carpet, after use can be recycled. The carpet sample is reduced in size such as by cutting, and then extruded using conventional techniques. Being able to extrude the reduced carpet is contrasted to carpets using styrene-butadiene adhesives which typically are less suitable to extrusion due in part to the difficulty in depolymerizing the styrene based polymer. The extrudate can then be molded into an article of manufacture using compression molding or any other conventional molding technique, the selection of which will be within the skill of one in the art.

The present invention and its advantages over the prior art will be more fully understood and appreciated from the illustrative examples which follow. It is to be understood that the examples are for the purpose of illustration and are not intended as being limiting upon the scope of the invention. A person skilled in the applicable arts will appreciate from these examples that this invention can be embodied in many different forms other than as is specifically disclosed.

EXAMPLES

Example 1

900 g of demineralized water is mixed with 1 g ethylene dinmine tetraacetic acid (EDTA), 10 g sodium dicyclohexyl sulfosuccinate and 3 g dodecyl diphenyl oxide disulfonate, and 4 g of ammonium persulfate, in a 1-gallon reactor. To this is added a mixture of 200 g methyl methacrylate, 160 g butadiene and 40 g of monomethyl maleate. The mixture is stirred and heated to 180° F. and maintained at that temperature for the rest of the reaction. After maintaining the temperature of 180° F. for 30 minutes, a mixture of 1100 g methyl methacrylate, 500 g butadiene and 4 g of t-dodecyl mercaptan is fed continuously into the reactor over a period of 5 hours. At the same time, a mixture of 10 g dicyclohexyl sulfosuccinate and 480 g of demineralized water is fed continuously for 4 hours into the reactor as is a mixture of 12 g ammonium persulfate and 500 g demineralized water over a period of 5 ½ hours. At about 50 percent actual conversion, a mixture of 3 g dodecyl diphenyl oxide disulfonate and 20 g of demineralized water is injected into the reactor.

The reaction is carried to about 98 percent conversion and cooled. The pH is adjusted to 7.0–7.5 with ammonia and then steam stripped to achieve the desired solid content (typically greater than 50 percent, often greater than 55 percent and sometimes greater than 60 percent). The polymer comprises 65 percent methyl methacrylate, 33 percent 1,3-butadiene and 2 percent monomethyl maleate.

EXAMPLES 2–15

In order to demonstrate the effectiveness of other polymer compositions, Example 1 is repeated except various non-aromatic mono- or dicarboxylic ester monomers and/or mono- or dicarboxylic acid monomers and half esters thereof are used. It is recognized that minor variations of Example 1 may be needed in order to utilize specific monomers. These variations will be within the skill of one in the art.

EXAMPLE 2

Example 1 is repeated except the polymer comprises 65 percent methyl methacrylate and 35 percent 1,3-butadiene.

EXAMPLE 3

Example 1 is repeated except the polymer comprises 60 percent methyl methacrylate, 38 percent 1,3-butadiene and 2 percent methacrylic acid.

EXAMPLE 4

Example 1 is repeated except the polymer comprises 60 percent methyl methacrylate, 38 percent 1,3-butadiene and 1 percent itaconic acid.

EXAMPLE 5

Example 1 is repeated except the polymer comprises 65 percent methyl methacrylate, 32.5 percent 1,3-butadiene, 2 percent monomethyl maleate and 0.5 methacrylic acid.

EXAMPLE 6

Example 1 is repeated except the polymer comprises 65 percent methyl methacrylate, 33 percent 1,3-butadiene and 2 percent acrylic acid.

EXAMPLE 7

Example 1 is repeated except the polymer comprises 65 percent methyl methacrylate, 33 percent 1,3-butadiene and 2 percent monomethyl itaconate.

EXAMPLE 8

Example 1 is repeated except the polymer comprises 65 percent methyl methacrylate, 33 percent 1,3-butadiene, 2 percent monomethyl maleate and 0.5 percent acrylic acid.

EXAMPLE 9

Example 1 is repeated except the polymer comprises 65 percent methyl methacrylate, 33 percent 1,3-butadiene and 2 percent monobutyl maleate.

EXAMPLE 10

Example 1 is repeated except the polymer comprises 65 percent methyl methacrylate, 33 percent 1,3-butadiene and 2 percent monooctyl maleate.

EXAMPLE 11

Example 1 is repeated except the polymer comprises 57 percent methyl methacrylate, 33 percent 1,3 -butadiene, 5 percent butyl acrylate, 3 percent acrylic acid and 2 percent iraconic acid.

EXAMPLE 12

Example 1 is repeated except the polymer comprises 52 percent methyl methacrylate, 33 percent 1,3-butadiene, 5 percent butyl acrylate, 5 percent ethyl acrylate, 2 percent iraconic acid and 3 percent acrylic acid.

EXAMPLE 13

Example 1 is repeated except the polymer comprises 48 percent methyl methacrylate, 45 percent 1,3-butadiene, 5 percent butyl acrylate and 2 percent monomethyl maleate.

EXAMPLE 14

Example 1 is repeated except the polymer comprises 28 percent methyl methacrylate, 50 percent 1,3-butadiene, 20 percent butyl acrylate and 2 percent acrylic acid.

EXAMPLE 15

Example 1 is repeated except the polymer comprises 65 percent methyl methacrylate, 33 percent 1,3-butadiene and 2 percent N-methylol acrylamide.

EXAMPLE 16

A polymer comprising 65 percent methyl methacrylate, 33 percent 1,3-butadiene and 2 percent monomethyl maleate is prepared according to Example 1. A latex emulsion coating is prepared by mixing 200 g (53–55 percent solids) polymer, 950 g calcium carbonate filler, 3 g Chemfroth 1878 foaming agent available from Chemtex Laboratories, Charlotte, N.C., and Paragum 178 thickener available from Parachem Southern, Simpsonville, S.C. The resulting mixture is adjusted to a solids content of about 83 percent with water.

A carpet is prepared comprising a tufted polypropylene primary backing and either a woven polypropylene secondary backing or a jute secondary backing with the latex emulsion coated thereon. Delamination was measured utilizing the ASTM-D3936 test method which determines the delamination strength of the secondary backing adhered to the primary backing. The delamination for the woven polypropylene secondary backing is 6.0 lbs/in and for the jute secondary backing is 6.2 lbs/in. The values are both comparable to values for styrene butadiene latex.

EXAMPLE 17

A polymer comprising 57 percent methyl methacrylate, 33 percent 1,3-butadiene, 5 percent butyl acrylate, 2 percent iraconic acid and 3 percent acrylic acid is prepared according to Example 1. A latex emulsion is prepared and coated on a tufted carpet according to Example 16. The delamination for the woven polypropylene secondary backing is 5.7 lbs/in.

EXAMPLE 18

A polymer comprising 65 percent methyl methacrylate, 33 percent 1,3-butadiene and 2 percent acrylic acid is prepared according to Example 1. A latex emulsion is prepared and coated on a tufted carpet according to Example 16. The delamination for the woven polypropylene secondary backing is 5.6 lbs/in.

EXAMPLE 19

A polymer comprising 65 percent methyl methacrylate, 33 percent 1,3-butadiene and 2 percent monobutyl maleate is prepared according to Example 1. A latex emulsion is prepared and coated on a tufted carpet according to Example 16. The delamination for the woven polypropylene secondary backing is 5.4 lbs/in and for the jute secondary backing is 6.1 lbs/in.

EXAMPLE 20

A polymer comprising 65 percent methyl methacrylate, 33 percent 1,3-butadiene and 2 percent monomethyl maleate is prepared according to Example 1. A latex emulsion coating is prepared by mixing 200 g (53–55 percent solids) polymer, 300 g calcium carbonate filler, 3 g Chemfroth 1878 foaming agent available from Chemtex Laboratories, Charlotte, North Carolina, 0.4 g Paragum 178 thickener available from Parachem Southern, Simpsonville, S.C., 2 g Chemwet 1396A wetting agent available from Chemtex, and 1 g hindered amine available from Goodyear Company, Akron, Oh. The resulting mixture has a solids content of 83 percent, adjusted with water.

A tufted nylon carpet is prepared. Tuft-lock is measured using the ASTM D-1335 test which measures the force required to pull one or both legs of a looped pile from the carpet. The tuft-lock was 18.3 lbs for a nylon tufted looped. pile carpet. The results are comparable to the tuft-lock values for a styrene-butadiene latex.

EXAMPLE 21

A polymer comprising 65 percent methyl methacrylate, 33 percent 1,3-butadiene and 2 percent monomethyl maleate is prepared according to Example 1. A latex emulsion coating is prepared by mixing 200 g (53–55 percent solids) polymer, 80 g calcium carbonate filler, 1.0 g Chemfroth 1878 foaming agent, and 2 g Paragum 178. The resulting mixture has a solids content of about 50 percent, adjusted with water.

A non-needled woven nylon upholstery fabric is prepared and the latex emulsion coating applied thereto at 4.0 oz/linear yard by frothing the coating to a 50 g/3 oz cup weight.

EXAMPLE 22

A polymer comprising 48 percent methyl methacrylate, 50 percent 1,3-butadiene and 2 percent acrylic acid is prepared according to Example 1. A latex emulsion coating is prepared and is applied to the non-needled woven nylon upholstery fabric according to Example 21.

EXAMPLE 23

A polymer comprising 53 percent methyl methacrylate, 45 percent 1,3-butadiene and 2 percent acrylic acid is prepared according to Example 1. A latex emulsion coating is prepared and applied to the non-needled upholstery fabric according to Example 21.

The upholstery fabrics of Examples 21 to 23 are tested for various properties. Wash resistance is measured by washing for 5 wash cycles and measuring the weight loss. Solvent swell is measured using ASTM Test Method D-471-48 with trichloroethylene and tetrachloroethylene as the solvents. UV exposure is measured by exposing to UV light in a QUV tester for 96 hours and graded as 1:no discoloration; 5:yellow; and 9:brown. Gas fade is measured by exposure to natural gas fumes and is graded as: 1:no discoloration; 5:yellow; and 9:brown. Heat age is measured by heating at 250° F. for 5 days and graded as: 1:no discoloration; 5:yellow; and 9:brown. Hand is measured by touch and graded as: 1:soft; 5:medium; and 9:stiff. Seam slippage in the warp and fill directions is measured by ASTM D4034. Examples 20–23 are compared to Comparative Example 1 (styrene-butadiene) and Comparative Example 2 (styrene-butadiene). The results are summarized in Table 1 and demonstrate that the present coating composition provides results comparable to conventional coating compositions.

TABLE 1

|  | Example 21 | Example 22 | Example 23 | Comparative Example 1 | Comparative Example 2 |
|---|---|---|---|---|---|
| Wash Resistance (% wgt loss) | 7 | 15 | 3 | 8 | 0 |
| Solvent Swell (% swell after 24 hrs.) | | | | | |
| Trichloroethylene | 185 | 206 | 316 | 300 | 352 |
| Tetrachloroethylene | 217 | * | 125 | 300 | 325 |
| QUV Exposure | 2 | 3 | 3 | 4 | 4 |
| Gas Fade | 2 | 2 | 2 | 2 | 2 |
| Heat Age | 5 | 7 | 6 | 4 | 8 |
| Hand | 5 | 2 | 2+ | 3+ | 3+ |
| Seam Slippage (lbs of force) | | | | | |
| Warp | 22 | 17 | 16 | 19 | 19 |
| Fill | 20 | 11 | 10 | 20 | 16 |

*Disintegrated

EXAMPLE 24

Carpet samples were made using a binder similar to Example 2 based on butadiene and methyl methacrylate, and a Comparative Example using styrene in place of methyl methacrylate is also made. Both samples (Example 24 and Comparative Example 3) are extruded using Haake Rheocord 90 equipped with a sigma twin blade mixer at 90–100 rpm. This is done by cutting the carpet samples into small strips and feeding through a hopper. The extruded material is passed through a cold water bath and then through a pelletizer. Extruded carpet is mixed with a compatibilizer comprising 2.5% Polybond® 3002 from BP Chemicals (Maleic anhydride grafted polypropylene) and 2.5% Kraton® G1921X (Maleic anhydride modified styrenic copolymer). The extrudate in the form of pellets is compression molded using a Wabash press. Once the samples are placed inside, a compression force of 2.5 tons is applied on an area of 13 cm ×13 cm, and the temperature is allowed to come to the set point. This took about 5 minutes and then the sample is maintained at the set temperature for 3 minutes under the abovementioned compressive load. Before each extrusion and molding step, each sample is dried at about 90° C. for 12 to 24 hrs. at atmospheric pressure. The tensile and elongation results of a dog bone-shaped article are set forth in Table 2.

TABLE 2

|  | Tensile Strength (psi) | % Elongation |
|---|---|---|
| Comparative Example 3 | 3082 | 32.5 |
| Example 24 | 3223 | 70.0 |

The tensile strength and elongation are clearly superior for the Example 24 sample.

In the specification, there have been disclosed preferred embodiments of the invention and, although specific terms are employed, they are used in a generic and descriptive sense only and not for the purpose of limitation, the scope of the invention being set forth in the following claims.

That which is claimed is:

1. A styrene-free polymeric textile coating composition comprising:
   (a) about 10 to 90 percent by weight non-aromatic unsaturated mono- or dicarboxylic ester monomer;
   (b) about 10 to 90 percent by weight aliphatic conjugated diene monomer; and
   (c) about 0.3 to 5 percent by weight of an unsaturated mono- or dicarboxylic acid monomer or a monomer based on a half ester of the unsaturated dicarboxylic acid.

2. The polymeric textile coating composition of claim 1 wherein the unsaturated mono- or dicarboxylic acid monomer is selected from the group consisting of monomers of acrylic acid, methacrylic acid, itaconic acid, maleic acid and fumaric acid, and wherein the monomer based on the half ester of the unsaturated dicarboxylic acid is selected from the group consisting of monoesters of maleic or fumaric acid having the formula ROOC—CH—COOH wherein R is a $C_1$ to $C_{12}$ alkyl group and monoesters of iraconic acid having $C_1$ to $C_{12}$ alkyl groups.

3. The polymeric textile coating composition of claim 1 wherein the non-aromatic unsaturated mono- or dicarboxylic ester monomer is selected from the group consisting of methyl acrylate, methyl methacrylate, ethyl acrylate, ethyl methacrylate, butyl acrylate, butyl methacrylate, 2-ethylhexyl acrylate, glycidyl acrylate, glycidyl methacrylate, dimethyl fumarate, diethyl fumarate, dimethyl maleate, diethyl maleate, dimethyl itaconate, hydroxyethyl acrylate, diethyl itaconate, hydroxyethyl methacrylate, hydroxypropyl acrylate, hydroxypropyl methacrylate, hydroxybutyl acrylate, hydroxybutyl methacrylate, 3-chloro-2-hydroxybutyl methacrylate, di(ethylene glycol) maleate, di(ethylene glycol)itaconate, bis(2-hydroxyethyl) maleate, 2-hydroxyethyl methyl fumarate, t-butylamino ethyl methacrylate and dimethylamino ethyl methacrylate monomers and blends and comonomers thereof.

4. The polymeric textile coating composition of claim 1 wherein the aliphatic conjugated diene monomer is a $C_4$ to $C_9$ diene monomer.

5. The polymeric textile coating composition of claim 4 wherein the $C_4$ to $C_9$ diene monomer is 1,3-butadiene.

6. The polymeric textile coating composition of claim 1 wherein the coating composition includes a crosslinking agent.

7. The polymeric textile coating composition of claim 6 wherein the crosslinking agent is a nitrogen-containing monomer.

8. The polymeric textile coating composition of claim 7 wherein the nitrogen-containing monomer is selected from the group consisting of N-methylol acrylamide, N-methylol methacrylamide, $C_1$–$C_4$ ethers of N-methylol acrylamide and methacrylamide, acrylamido glycolic acid, $C_1$–$C_4$ esters of acrylamido glycolic acid, and alkylacrylamido glycolate alkyl ethers.

9. The polymeric textile coating composition of claim 1 wherein the coating composition includes acrylonitrile, methacrylonitrile, acrylamide or methacrylamide.

\* \* \* \* \*

UNITED STATES PATENT AND TRADEMARK OFFICE
CERTIFICATE OF CORRECTION

PATENT NO. : 5,502,138

DATED : March 26, 1996

INVENTOR(S) : Krishnan et al.

It is certified that error appears in the above-identified patent and that said Letters Patent is hereby corrected as shown below:

Column 4, line 12, please delete "iraconic" and insert therefor --itaconic--.

Column 5, line 21, delete "dinmine" and insert therefor --diamine--.

Column 6, lines 48 and 55, please delete "iraconic" and insert therefor --itaconic--.

Column 10,
In Claim 2, line 4, delete "itaconic" and insert therefor --itaconic--.

line 8, delete "ROOC-CH-COOH" and insert therefor --ROOC-CH=CH-COOH--.

Signed and Sealed this

Twenty-second Day of October, 1996

Attest:

BRUCE LEHMAN

*Attesting Officer*  *Commissioner of Patents and Trademarks*